United States Patent [19]

Delafosse et al.

[11] 4,224,107

[45] Sep. 23, 1980

[54] SPACER GRIDS FOR A NUCLEAR REACTOR FUEL ASSEMBLY

[75] Inventors: Jacques Delafosse, Gif-sur-Yvette; Claude Feutrel, Vauhallan, both of France

[73] Assignee: Commissariat a l'Energie Atomique, Paris, France

[21] Appl. No.: 904,452

[22] Filed: May 9, 1978

Related U.S. Application Data

[63] Continuation of Ser. No. 757,566, Jan. 7, 1977, abandoned.

[51] Int. Cl.² .................................................. G21C 3/30
[52] U.S. Cl. .......................................... 176/78; 176/76
[58] Field of Search ................................. 176/78, 76

[56] References Cited

U.S. PATENT DOCUMENTS

| | | | |
|---|---|---|---|
| 3,379,617 | 4/1968 | Andrews | 176/78 |
| 3,751,335 | 8/1973 | Keith | 176/78 |
| 3,920,515 | 11/1975 | Ferrari | 176/78 |
| 3,929,569 | 12/1975 | Piepers | 176/78 |
| 3,932,216 | 1/1976 | Jabsen | 176/78 |
| 3,944,467 | 3/1976 | Biermann | 176/78 |
| 4,028,180 | 6/1977 | Finch | 176/78 |
| 4,061,536 | 12/1977 | Creagan | 176/78 |

*Primary Examiner*—Samuel W. Engle
*Assistant Examiner*—Donald P. Walsh
*Attorney, Agent, or Firm*—Kerkam, Stowell, Kondracki & Clarke

[57] ABSTRACT

The spacer grid for a nuclear reactor fuel assembly has an open structure constituted by an array of flat sheet metal members in interfitting relation and defining compartments. Narrow corrugated strips project into the interior of the compartments and form separations between openings of substantial width in the surface of the sheet metal members and an outer frame surrounds the structure. The sheet metal members are joined to the corrugated strips by means of a zone having lower mechanical strength so as to increase the deflection of each strip in respect of the same applied force.

2 Claims, 9 Drawing Figures

SPACER GRIDS FOR A NUCLEAR REACTOR FUEL ASSEMBLY

This is a continuation, of application Ser. No. 757,566, filed Jan. 7, 1977 now abandoned.

This invention relates to nuclear reactor fuel assemblies each constituted by a cluster of parallel fuel pins of substantial length and small cross-sectional area each containing a stack of nuclear fuel pellets within a metal can. This fuel cluster is associated along the length of the fuel pins with spacer grids placed at uniform intervals so as to permit suitable bracing of the fuel pins with respect to each other while preventing vibrations of these latter and deformation of the initial geometry of the cluster under the action of the stresses to which the fuel assembly is subjected during operation within the reactor core.

In a fuel assembly of this type which is usually intended to be employed in a light-water reactor, the invention is more particularly applicable to an improvement in the construction of the spacer grids of the fuel-pin cluster.

It is known that a spacer grid of the type mentioned above is usually constituted by an open structure formed by two sets of sheet metal members which are parallel to each other but oriented in two perpendicular directions in each set. Said sheet metal members are intended to interengage in slits formed lengthwise in these latter and thus constitute a series of compartments having a generally square cross-section through which the fuel pins are intended pass in a direction parallel to the plane of said sheet metal members. A number of different solutions have already been proposed in order to ensure correct positioning of said fuel pins within each compartment of the spacer grid and especially in order to ensure suitable stress distribution on the fuel-pin cans at the level of each spacer grid. In particular,* the sheet metal members of the grid are provided with wide openings separated by narrow corrugated strips forming springs and projecting either inwardly or outwardly from the compartments so as to provide, in conjunction with other corrugated strips or with bosses formed in the solid portions of the sheet metal members, a series of bearing points for each fuel pin at the location corresponding to the passage of said pin through each compartment. Each fuel pin is thus maintained in two different directions at four points spaced at uniform intervals at its periphery and also at a number of points in the longitudinal direction by means of as many spacer grids as the total number provided for the fuel assembly. By making use of narrow corrugated strips for separating open portions having appreciable dimensions, the coolant fluid which circulates in contact with the fuel assembly ensures efficacious cooling of the fuel pins; furthermore, the shape and arrangement of the corrugated strips and of the bearing bosses makes it possible to ensure efficacious absorption of vibrations and expansions during operation.

\* in the U.S. Pat. No. 3,674,687 of June 20, 1969

In a practical design of this type, the corrugated strips which form springs must maintain the fuel pins with a sufficient bearing force against the fixed bosses of the sheet metal members, especially in order to prevent wear as a result of impact of the fuel-pin cans against said bosses under the action of vibrations produced by the flow of the coolant fluid. On the other hand, the clamping action thus produced on the fuel pins must not be too powerful in order to prevent collapse of the fuel cans. However, the springs constituted by the corrugated strips must provide adequate compensation for manufacturing tolerances allowed on the diameters of the fuel pins and on the dimensions of the spacer grid compartments. In consequence, the curve representing the force applied by the spring formed by each corrugated strip as a function of its deflection must be as flat as possible within the operating range corresponding to a bearing pressure which varies only to a slight extent in respect of a range of deflection which can on the contrary vary to an appreciable extent; it is therefore found necessary to increase the flexibility of the spring without thereby permitting the possibility of modifying the spacing of the sheet metal members of the grid.

The present invention is directed to an improvement which is made in spacer grids of the type referred-to in the foregoing and which meets this requirement.

To this end, the invention is characterized in that the sheet metal members are joined to the corrugated strips by means of a zone which has lower mechanical strength and increased flexibility and increases the deflection due to increased flexibility of each strip in respect of the same applied force.

Further properties of a spacer grid which is improved in accordance with the arrangements of this invention will become apparent from the following description in which a number of exemplified embodiments are given by way of indication and not in any limiting sense, reference being made to the accompanying drawings, wherein.

Figure 1:
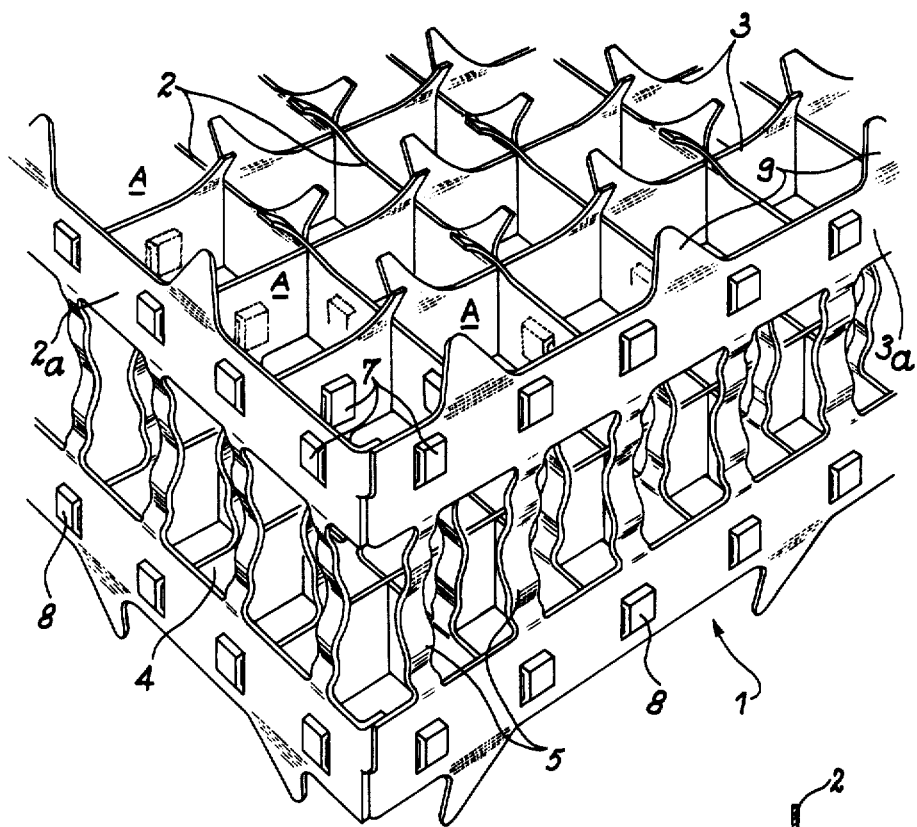
FIG. 1 is a fragmentary diagrammatic view in perspective showing a grid of a type which is already known in the technique.

In FIG. 1, the spacer grid under consideration is of a type known per se and generally designated by the reference numeral 1. This grid comprises two series of parallel sheet metal member 2 and 3 located at right angles to each other so as to define compartments A of approximately square cross-section. Said compartments are provided for the passage of canned fuel pins (not shown) of a fuel assembly for a nuclear reactor and especially a light-water reactor. The two series of perpendicular sheet metal members 2 and 3 are interengaged, for example by means of narrow slits formed at intervals along the sheet metal members, said members being also fixed on an outer frame. The two sides of said frame which are shown in the drawing are designated respectively by the references 2a and 3a.

Figure 2:
FIG. 2 is a sectional view in elevation showing a corrugated strip of the grid in accordance with FIG. 1.

In order to ensure that the fuel pins are maintained within the compartments A of the spacer grid, the sheet metal members 2 and 3 are provided with central open portions 4 of substantial width separated by corrugated strips 5 each having at least one projecting portion 6 which is directed towards the interior of the opposite compartment. These projecting portions 6 of the corrugated strips 5 are intended to apply the fuel pins against bosses 7 and 8 respectively, only a few of which are illustrated in order not to complicate the drawing unduly. Said bosses are formed in the sheet metal members 2 and 3 at the top and bottom portions of these latter. The sectional view of FIG. 2 shows in greater detail the profile and relative arrangement of the bosses 7 and 8 and of the corrugated strip 5 in any particular sheet metal member 2 of the spacer grid.

The top and bottom edges of the sheet metal members 2a and 3a of the spacer grid frame are advantageously provided with teeth 9 having a slightly rounded shpae and inclined towards the center of the spacer grid, said teeth being intended to facilitate the positioning of said grid and as far as possible to prevent interengagement of two adjacent grids in two adjacent fuel assemblies at the time of operations which entail the need for relative handling of said assemblies.

Figure 3:
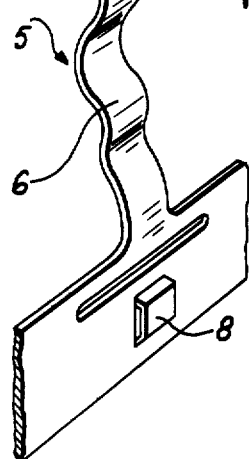
FIGS. 3, 4, 5 and 6 are views in perspective showing different alternative forms of construction of the sheet metal members and corrugated strips in accordance with the arrangements provided by the present invention.

In accordance with the invention and as shown in greater detail in FIG. 3, the flexibility of each corrugated strip 5 is improved by making provision in the sheet metal members 2 and 3 for zones of reduced mechanical strength and especially slits 10 near the points of junction between said members and each corrugated strip. In the example of construction under consideration, said slits 10 extend in a direction which is parallel to the opposite edges of the sheet metal members and which is substantially perpendicular to the direction of the corresponding strip. By means of said strips 10 which are formed in the solid portions of the sheet metal members between the strips 5 and the bosses 7 and 8, the twisting of that portion of the sheet metal member which is located between said slit and the strip itself is thus made to take part in the bending stress applied to each corresponding strip, thus considerably improving the flexibility of the complete assembly. In all other respects, the spacer grids thus provided are similar to the grid shown in FIG. 1, especially in regard to the shape of the compartments and of the outer frame.

Figure 4:
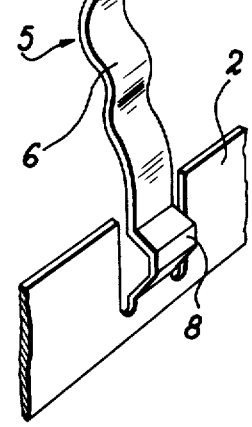

In another alternative embodiment shown in FIG. 4, the corrugated strips 5 are formed through the sheet metal members 2 and 3 of the spacer grid, thus directly incorporating the bosses 7 and 8. By means of this solution, said bosses on which the fuel pins are applied within each compartment are no longer in stationarily fixed positions. This results in interdependence of the compartments since a force of greater magnitude applied to any one corrugated strip which forms a spring is transmitted to the bosses of the adjacent compartment and so on in sequence within the spacer grid, thus achieving equalization of the forces applied to the fuel pins throughout the entire spacer grid.

In another alternative embodiment, the corrugated strips of the grid are still joined to the flat sheet metal members at their extremities so as to form light-weight junction zones in accordance with either of the arrangements contemplated in the foregoing but are in turn provided in this instance with open portions so arranged as to form in said strips bearing-arms which have relative elasticity with respect to the strips. Said strips therefore provide an association of two spring assemblies which produce combined actions on the fuel pencils which pass through the spacer grid, with a resultant deflection of considerably increased value in respect of a given bearing pressure.

Figure 5:
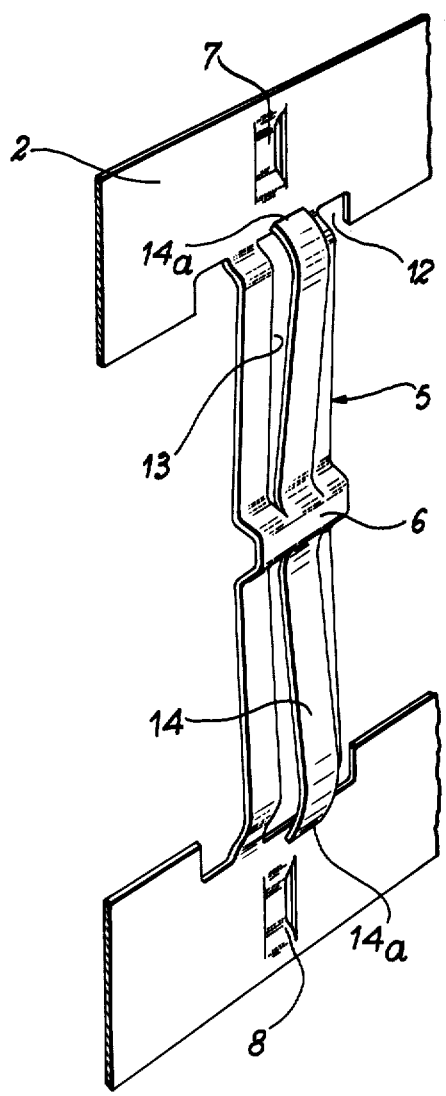

In FIG. 5, which corresponds to the alternative embodiment mentioned above, the sheet metal members such as 2 or 3 of the spacer grid which are joined together by means of the corrugated strips 5 are provided with lateral slits 12 having a suitable profile in order to improve the deflection of the strip in its zone of junction with the sheet metal members of the grid. In this alternative embodiment, however, each corrugated strip is in turn provided with open portions 13 so as to form two bearing-arms 14 extending on each side of the central portion 6 of each strip and joined elastically to said strip at one end, the profile and length of which are so determined that the bearing-arms 14 cannot penetrate through the slits 13 and then completely withdraw, even in the event of an appreciable force applied on these latter. At the time of positioning of a fuel-pin spacer grid within each compartment A, the fuel pin applies a force first to one and then to the other bearing-arm 14; this force increases and first has the effect of abuttingly applying the extremities 14a against the solid portion of the strip 5. If the force continues to increase, the fuel pin bears on the central portion 6 and then produces the deflection of the strip 5 itself. The embodiment considered therefore utilizes two successive elastic actions which are combined with each other while permitting more effective transfer of forces applied on the fuel pins, especially in regard to vibrations or deformations during use.

Figure 6:
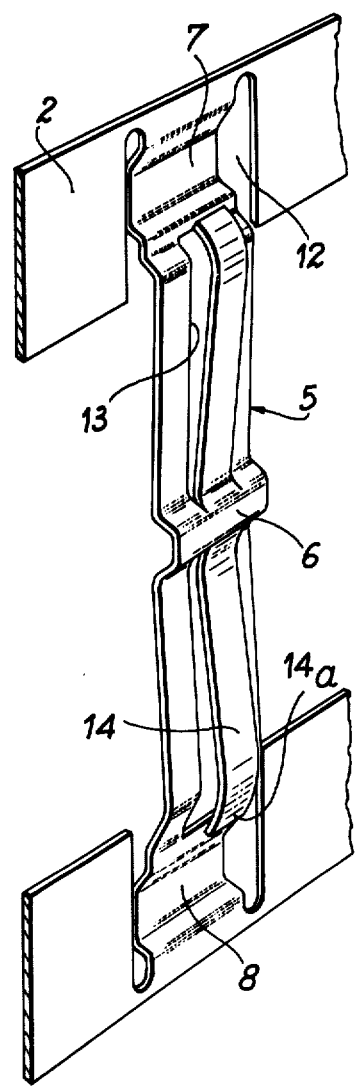

FIG. 6 illustrates another alternative embodiment which combines the arrangements of the examples shown in FIGS. 4 and 5 with an increase in length of the corrugated strips, the ends of which carry the bearing bosses within an adjacent compartment of the grid and the central portions of which carry the resilient bearing-arms.

Figure 7:
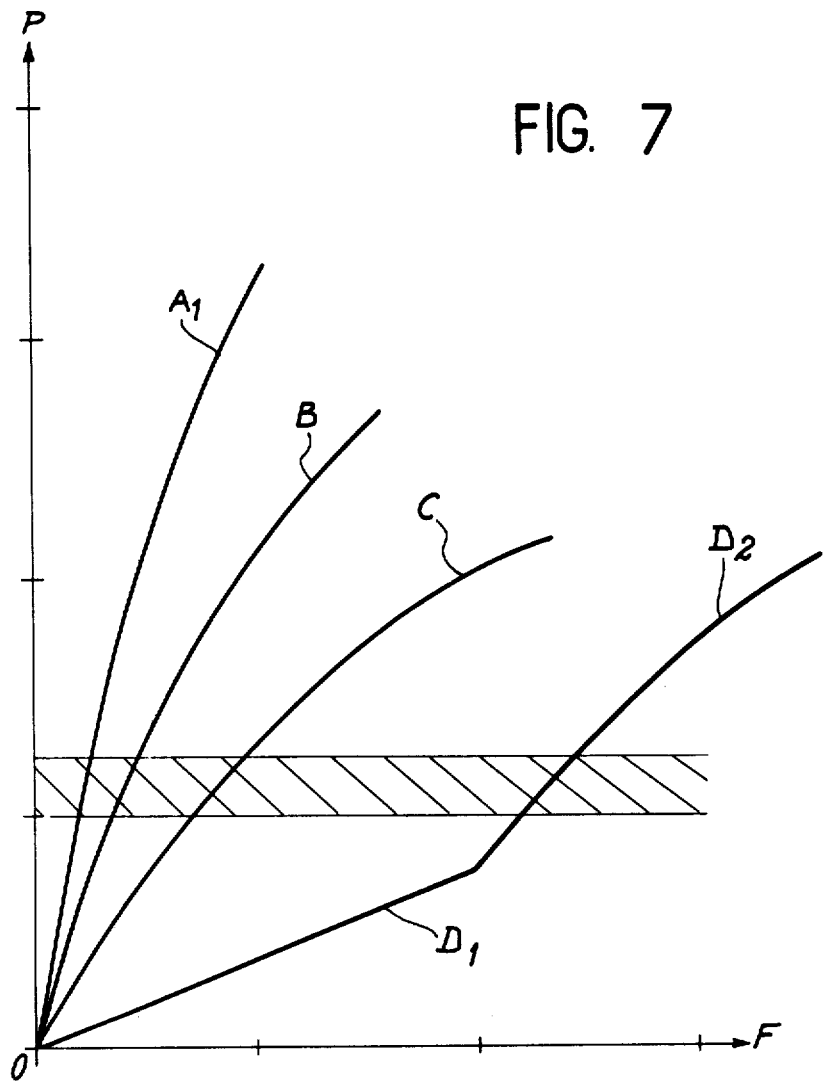
FIG. 7 illustrates a series of curves which give the non-linear variation in contact pressure as a function of the deflection of the springs employed in the design solutions shown in FIGS. 3 to 5.

In the graphic representation of FIG. 7, the set of curves gives the compared values of deflections in respect of a predetermined range of contact pressures of the springs on the fuel-assembly pins corresponding to the practical range of use of said springs. The cross-hatched zone in the drawing gives a diagrammatic indication of this range. The curve $A_1$ corresponds to a bearing spring of the prior art as recalled at the beginning of this description. The curves B, C and D correspond to variants of FIGS. 3, 4 and 5 respectively. It can thus be seen that the deflection increases substantially in respect of a given bearing pressure when changing over from one of these variants to another. A study of these curves makes it possible to choose the most suitable form of construction while taking other parameters into account. In particular, the curve D relating to the variant in accordance with FIG. 5 has two successive portions $D_1$ and $D_2$ corresponding on the one hand to application of the resilient bearing-arms 14 and on the other hand to deflection of the corrugated strip 5. It is thus apparent that, at the cost of a slightly more complex practical construction, the deflection of the springs can vary to a substantial extent without thereby causing the bearing pressure to depart from the intended range of utilization. This carries an advantage in that adjustment of the pressure of the springs is facilitated when the spacer grid is initially employed.

Figure 8:
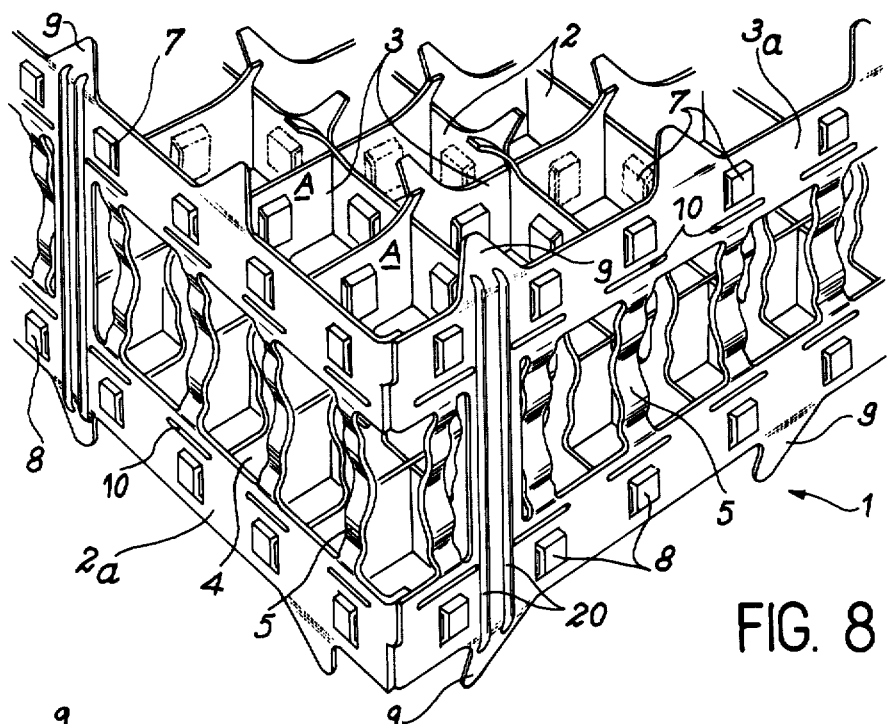
FIGS. 8 and 9 illustrate two particular alternative embodiments of a grid in accordance with the invention.
Figure 9:
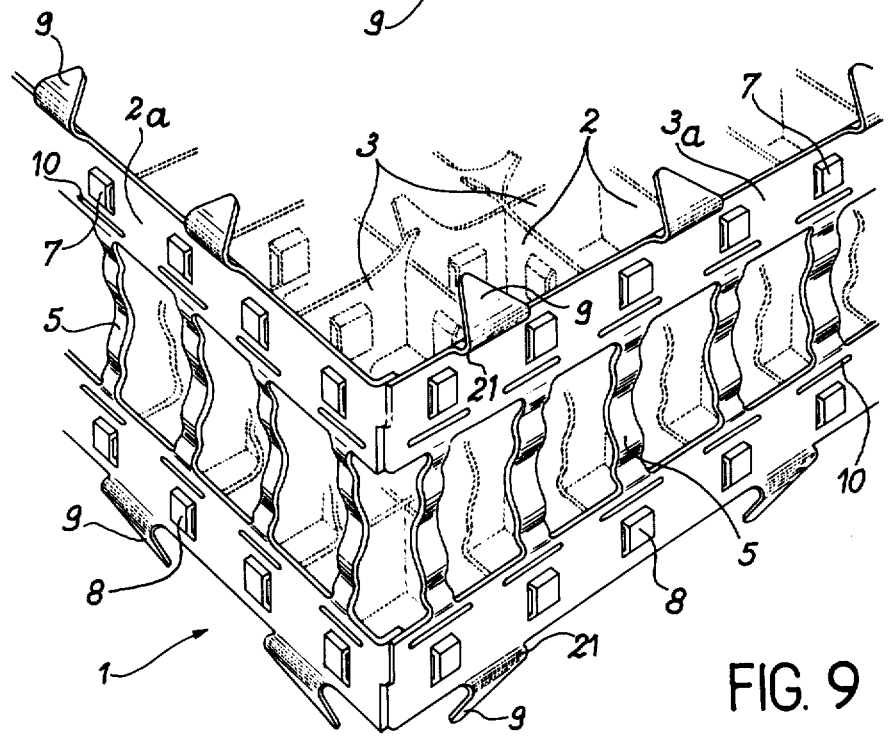

Finally, FIGS. 8 and 9 illustrate an advantageous improvement in an assembly grid which makes use of the corrugated strips described in any one of the alternative embodiments given in the foregoing. This improvement provides more favorable conditions for positioning or withdrawal of the different fuel assemblies in the reactor core, especially without entailing any danger of accidental interengagement of adjacent assembly grids. It is in fact known that, in conventional designs, certain difficulties are liable to arise at the time of positioning of a fuel assembly within the reactor core or withdrawal from this latter, especially after a long period of operation within the core. As a result of deformations caused by irradiation, the edges of the sheet metal members constituting the spacer grids of any given fuel assembly are liable to engage accidentally with the grids of adjacent fuel assemblies, thus preventing insertion or withdrawal of said assembly. It should be noted in addition that the withdrawal of a fuel assembly can normally take place only by handling the upper end of said assembly since there is no possibility of handling this latter either from the lower end or along the sides.

In order to circumvent the disadvantages noted above, it has already been proposed to provide rounded teeth such as those designated by the reference 9 in FIG. 1, both at the top and bottom of the sheet metal members which constitute the external sides of each spacer grid. Said teeth are inclined towards the center of the spacer grid in order to ensure that the grids can be more readily guided with respect to each other when they form part of two adjacent fuel assemblies. However, this arrangement may not prove sufficient in practice to ensure that the spacer grids are placed in position with an appreciable degree of safety and without any attendant danger of accidental interengagement. In order to overcome this drawback, the teeth 9 provided on the sides of the outer frame of the spacer grid 1, for example on the sides 2a and 3a, are associated with projecting ribs 20 for guiding the spacer grids with respect to each other at the time of positioning of the fuel assemblies. There is thus formed between two adjacent frames in two adjacent fuel assemblies a lateral clearance which is at least equal to the thickness of said ribs 20. In the example of construction shown in FIG. 8, the ribs 20 aforesaid are oriented so as to extend at right angles to the longitudinal direction of the sides 2a or 3a which constitute the outer frame of the spacer grid. The arrangement of the ribs in the sheet metal members is such that said ribs are located at predetermined intervals along the length of said members.

In a final alternative embodiment shown in FIG. 9 in which the same reference numerals have again been employed to designate similar components, the ribs which serve to achieve relative spacing of two adjacent grids by projecting from the apparent contour of the outer frame are constructed by suitably shaping the rounded teeth 9 formed on the top edges of the sheet metal members. In particular, said teeth are slightly bent back in the outward direction before being bent inwards and consequently have outwardly projecting bulges 21 which, in the example shown in the figure, extend transversely and parallel to the longitudinal direction of the sides 2a and 3a.

Whatever form of construction may be adopted, the grid provided in accordance with the invention for supporting and guiding the pins of a fuel cluster in a fuel assembly offers outstanding advantages. Especially when use is made of corrugated strips forming springs as illustrated in the accompanying drawings, there is accordingly obtained suitable equalization of the bearing pressures as well as an increased bearing distance or length of span, particularly in the case of the alternative embodiments shown in FIGS. 4 and 6 in which the projecting bosses within one compartment form an integral part of a corrugated strip which in turn penetrates into an adjacent compartment. This results in a more uniform weight distribution throughout the spacer grid, in more effective damping of vibrations and in a lower degree of wear of the fuel pins.

It is also worthy of note that, in the alternative embodiment shown in FIGS. 5 and 6 in which a substantial deflection can be obtained in spite of a short span between bearing points, a further advantage lies in the possibility of manufacture without excessively close dimensional tolerances. This is not the case with conventional springs formed in one piece in which the permissible deflection of the order of 0.4 mm at the point of passage of a fuel pin entails the need for highly accurate manufacture and strict standards of position control which cannot readily be put into practice in an industrial manufacturing process. When making use of a corrugated strip in accordance with the invention, the spring which is thus formed has two separate and distinct portions which can easily be manufactured by cutting-out and bending of the bearing-arms in the central bearing arm itself. The strip is set at the center of the corrugated strip, with the result that the respective deflections are permitted to build-up at the time of application of a load on the corrugated strip. There takes place an overall deflection of the strips and bearing-arms; these latter accordingly begin to undergo deflection (curve $D_1$ of FIG. 7) until the fuel pins come into contact with the central boss; this is followed by deflection of the strips along (curve $D_2$).

The constructional dimensions of the essential parts of a fuel assembly grid in accordance with the invention, especially in the alternative embodiment shown in FIG. 4, are given hereunder by way of indication:

width of corrugated strips forming springs: 2.5 mm
thickness of strips: 0.4 mm
depth of the end bosses: 1.4 mm
distance of projection of the strips with respect to the plane of the sheet metal members of the grid: 2.5 mm
maximum distance between the ends of the slits in the sheet metal members: 33 mm.

In the case of the alternative embodiment shown in FIG. 5, a particular example of construction leads to the adoption of the following dimensions:

total width of corrugated strips: 5.4 mm
width of the central bearing-arms: 2.4 mm
distance between the sheet metal members: 23 mm
thickness of strips: 0.4 mm
distance of projection of the bearing-arms with respect to the plane of the sheet metal members: 3 mm
maximum deflection of the bearing-arms: 0.5 mm.

Finally, in the case of a grid in accordance with either FIG. 8 or FIG. 9 in which any one of the embodiments shown in FIGS. 3 to 6 is employed for the corrugated strips, the preferential dimensions adopted for one particular example of construction are:

(a) FIG. 8
width of projecting spacing ribs: 1.6 mm
relative spacing of said ribs: 4.8 mm
length of ribs: 40 mm
width of sheet metal members of grid frame: 10 mm
length of said sheet metal members: 212.8 mm
(b) FIG. 9
distance of projection of end teeth: 0.5 mm
angle of bending-back towards the interior: 30°.

As will be readily apparent, the invention is not limited solely to the examples which have been more especially contemplated in the foregoing but extends on the contrary to all alternative forms. In particular, no special assumption has been made in regard to the material constituting the grid and corrugated strips but preference will be given to the use of the alloy known as "Inconel 718" or of a suitable zirconium alloy.

What we claim is:

1. An improvement in spacer grids for nuclear reactor fuel assemblies having an open structure of an array of flat sheet metal members in interfitting relation and defining compartments, narrow corrugated strips having a long direction projecting into the interior of said compartments and forming separations between openings of substantial width in the surface of said sheet metal members, spaced bosses in said sheet metal members adjacent said strips and also in said strips and an outer frame surrounding said structure, the improvement comprising said sheet metal members being joined to said corrugated strips with greater flexibility of said sheet metal members to increase the non-linear deflection of said strips in respect of the same applied force, said sheet metal members further including spaced slits at the junction with and one on each side of and parallel to said long direction of said corrugated strips whereby to torsion applied to said sheet metal members is added to the deflection of said strips, each of said corrugated strips having a central portion, openings in each of said strips extending away from said central portion towards the adjacent one of said sheet metal members, a bearing-arm extending from said raised central portion over each of said openings toward the adjacent one of said sheet metal members forming two bearing-arms for each of said strips, said bearing-arms having relative elasticity with respect to said strips.

2. An improved spacer grid as described in claim 1, each of said bearing-arms having an extremity turned toward the adjacent one of said sheet metal members for abutting contact with an adjacent portion of said strip when a sufficient force is applied to said bearing-arm.

* * * * *